Aug. 9, 1932.  B. M. SAWYER  1,870,530
SEMIAUTOMATIC BOLT NUTTING MACHINE
Filed Aug. 1, 1929  2 Sheets-Sheet 1

Inventor
B. M. Sawyer.
By Robb & Robb
Attorneys

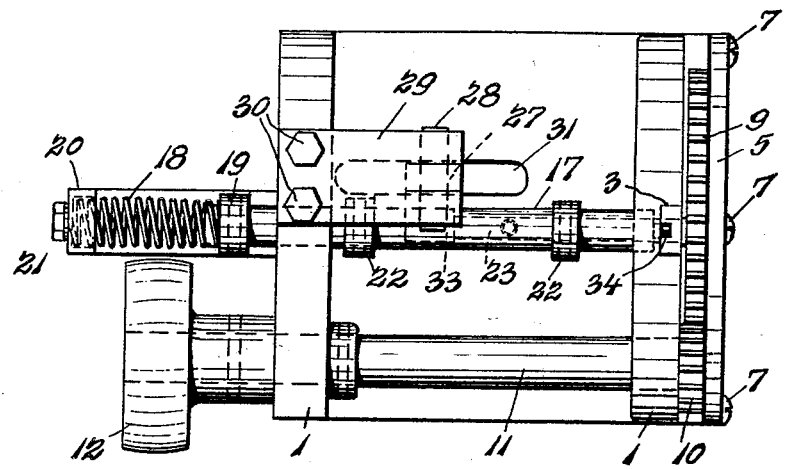
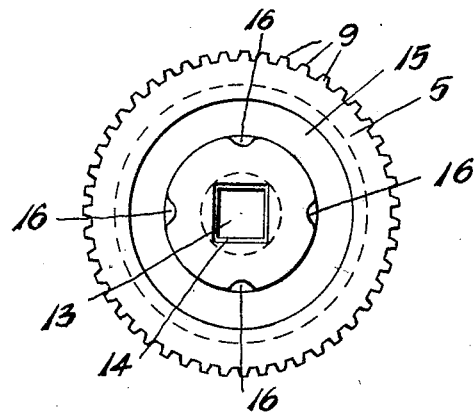

Patented Aug. 9, 1932

1,870,530

UNITED STATES PATENT OFFICE

BEN M. SAWYER, OF CLEVELAND, OHIO

SEMI-AUTOMATIC BOLT NUTTING MACHINE

Application filed August 1, 1929. Serial No. 382,610.

In the manufacture of bolts and nuts it is common practice to apply the nuts to the bolts previous to packing of the same for shipment or stock purposes.

This nutting of the bolts is generally done by hand, the operator grasping a nut in one hand, a bolt in the other and applying the nut to the bolt for one or more turns as desired. The nutted bolts are then stacked in packages of the desired number for packing purposes. Quite often the nuts are only slightly engaged with the bolts and subsequent to packing of the same some of the nuts become disengaged, whereupon the package is very often broken open.

In this hand method of applying nuts to bolts, a single bolt is grasped with the fingers around the threaded portion close to the end thereof. This prevents inspection of the threads of the bolt. After the bolt is nutted it is arranged in a stack with other bolts which have been similarly nutted.

The object of my invention is to provide a novel device for speeding up the application of nuts to bolts. I have provided semi-automatic means for handling the nuts and giving them a rotative motion. The operation of the device is controlled by the foot of the operator, thereby leaving both hands of the operator free to apply the bolts to the nuts and stack the nutted bolts.

Another object of my invention is the provision of means for positively transferring a nut from a chute to a rotating die.

In the present embodiment of my invention I make use of a gravity chute for delivering nuts in front of a revolving die which has an opening therein corresponding to the periphery of the nut. The nut is delivered from the chute to the revolving die by means of a plunger which is controlled by novel timing mechanism. The timing mechanism is arranged so as to permit delivery of a nut from the chute to the revolving die only when the periphery of the nut and the opening in the die have become aligned.

A further object of my invention is the provision of means for limiting the number of turns or threads that a nut will engage a bolt. Because of this novel arrangement every nut will engage its corresponding bolt the same number of turns. This uniformity of engagement of the nuts with the bolts will permit a better package to be made and will decrease the likelihood of the nuts becoming disengaged from the bolts.

Further and more detailed objects of my invention will become apparent, as a description of the same proceeds.

For a full and more complete understanding thereof, reference may be had to the following description and accompanying drawings, in which—

Figure 2 is a plan view of the same.

Figure 3 is a plan view of the rotating die and brings out the timing notches and clearance groove.

Figures 1, 4:
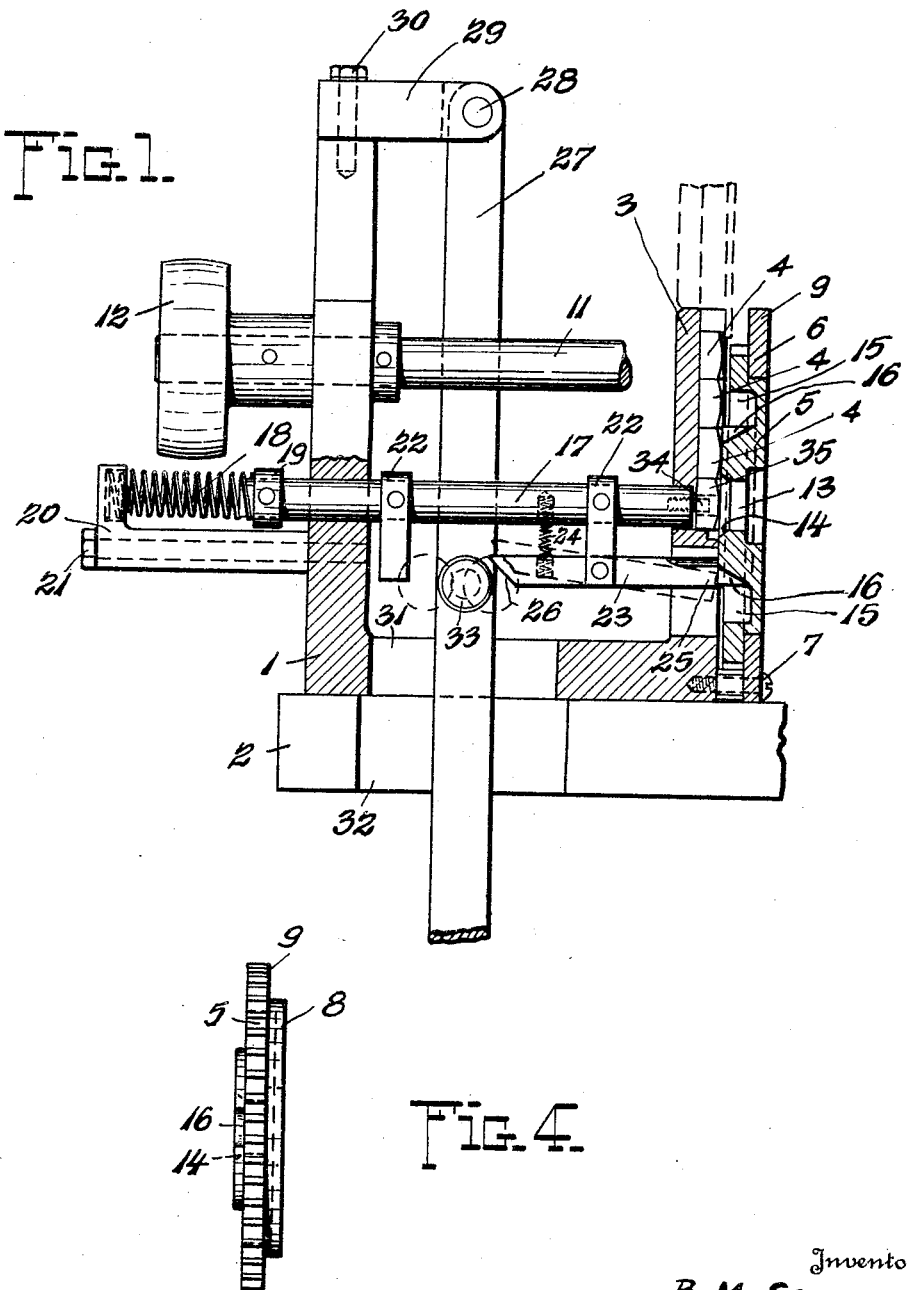
Figure 1 is a view in side elevation of my novel device with parts in section to more clearly bring out the construction thereof.
Figure 4 is a side view of the die shown in Figure 3.

While a specific embodiment of my invention is herein disclosed, it is to be understood that various changes may be made therein, and that I am to be limited only in the purview of the appended claims.

Referring particularly to Figure 1, my device comprises a main frame member 1, preferably a casting which is shown mounted on a bench 2. A gravity chute 3, made integral with the frame 1, is supplied with nuts 4 from any desired type of automatic hopper not shown. The chute 3 is disposed at an angle to the horizontal so that the nuts 4 are fed to the bottom thereof, by the action of gravity, the edge of one nut abutting the edge of the adjacent nut. The lower end of the chute 3 is provided with an opening to permit delivery of the lowermost nut to a die plate 5, which is held in position by a plate 6, secured to the frame 1 by any suitable means, such as the screws 7. The die plate 5 is provided with a circular extension 8 for which the plate 6 acts as a bearing. The outer periphery of the die plate 5 is provided with teeth as indicated at 9, which teeth are in engagement with the pinion 10 secured to a shaft 11 which has bearings in the frame 1. The shaft 11 is also provided with a pulley 12, which in turn is connected to any suitable source of power not shown. The die plate 5 is preferably driven at a speed of about forty revolutions per minute for obtaining the best results.

Referring particularly to Figure 3, it will be seen that the die plate 5 is provided at its center with an opening 13, which opening conforms to the periphery of the nuts 4. In the present instance, this opening is square, although it might be hexagonal or any other shape, depending upon the kind of nuts being used, and the edges of the die plate forming the opening 13 are beveled as shown at 14. The opening 13 is square about one half the distance through the die plate, and then abruptly changes to a circle of greater diameter than the distance across corners of the nuts. The die plate 5 is also provided with a clearance groove 15, and timing notches 16 communicating therewith, for purposes to be hereinafter set forth. A plunger 17 is journaled near one end in the frame 1, and at the other end in the chute 3, the axis of the plunger being aligned with that of the revolving die plate 5. The plunger 17 is constantly urged towards the die plate 5 by means of a coil spring 18, one end of which abuts a sleeve 19 secured to the plunger 17, and the other end of which is in engagement with the bracket 20 secured to the frame 1 by means of a bolt 21. Intermediate the ends of the plunger 17 and secured thereto, are two arms 22' which are spaced apart one from the other. To the arm 22' which is closest to the chute 3, is pivotally mounted a timing finger 23, which is constantly urged to the full line position as shown in Figure 1 by means of the coil spring 24. In this position the end 25 of the timing finger 23 abuts the die plate 5 at a point removed from the clearance groove 15 and timing notches 16. The other end of the timing finger 23 is formed with a cammed surface as shown at 26.

An operating lever or treadle 27 is pivotally secured at 28 to a bracket 29 which in turn is affixed to the frame 1 by means of the bolt 30. This lever 27 extends through openings 31 and 32 in the frame 1 and bench 2 respectively, and is adapted to be controlled by the foot of the operator. The lever 27 has a cylindrical member 33 secured thereto which, when the lever is moved in the proper directions, will abut arm 22 or the cam surface 26 of the timing finger 23.

The plunger 17 is also provide with a gauge 34 which has screw threaded engagement with said plunger whereby the gauge may be adjusted.

In the operation of the device, it must first be remembered that the die plate 5 is constantly rotating.

The lever 27 is moved to the left by the foot of the operator, whereupon the member 33 will engage the arm 22, moving the plunger 17 against the action of the spring 18. At this time a nut will drop to the position denoted 35. The lever 27 is then moved back to the position as shown. The plunger 17, under the influence of the spring 18 will also move to the position as shown with the end 25 of the timing finger 23 abutting the die plate 5. It is to be noted that the gauge 34 enters the opening in the nut, but does not have contact with the threads of the nut. A bolt is then grasped by the operator and the screw threaded end thereof presented to the opening 13. The operator then moves the lever 27 to the right whereupon the member 33 will engage the cam surface 26 of the timing finger 23, causing the same to move to the dotted position against the action spring 24. In this dotted position, the end 25 of the timing finger 23 is in the path of travel of the timing notches 16, and when one of these notches becomes aligned with the end 25, the plunger 17 moves to the right under the action of the spring 18, thereby delivering the nut to the rotating die plate at the instant when the opening 13 therein becomes properly aligned with the periphery of the nut. The nut is therefore rotated, causing the same to become applied to the bolt which the operator is holding. This bolt should be pressed toward the plunger 17 so that the end of the bolt engages the end of the gauge 34. Continued rotation of the nut will cause the same to work itself out of the squared portion of the opening 13 in the die plate 5. This nutted bolt can then be stacked by the operator with one hand, while another bolt is presented to the opening 13 with the other hand and the lever 27 is moved, as above set forth, by the operator's foot.

It can thus be readily seen that I have provided a novel device for use in nutting bolts, whereby both of the operator's hands are left free for handling and stacking the bolts. In the operation of this device, the bolts are grasped above the screw threaded portion of the shank so that the threads thereon may be readily inspected while the nut is being applied thereto.

Having thus described my invention what I claim as new and desire to secure by Letters Patent, is:—

1. In a device of the class described, in combination, a chute for feeding nuts, a constantly rotating receiving means having an opening substantially corresponding in configuration to that of the nuts for receiving the nuts, and instrumentalities for transferring the nuts from said chute to said means, and timing mechanism for rendering said instrumentalities operative when the opening in said means becomes registered with a nut.

2. A device for assembling nuts and bolts comprising in combination, a chute for nuts, a constantly rotating die plate having an opening therein corresponding to the configuration of the nuts, said opening extending partly through the die plate and then being enlarged into a circular opening extending through the remainder of the plate for permitting the free removal of the assembled article therethrough, timing means for delivering a nut from said chute to the die plate only when the first mentioned opening in the die plate aligns with the configuration of the nut, an adjustable stop gauge on the delivering means adapted to engage the end of a bolt to be nutted when it is inserted into the nut, said stop gauge constituting means for causing the nut to be moved from the nut receiving opening into the enlarged opening after a predetermined number of revolutions of the die plate.

3. A device of the class described, comprising, in combination, a chute, a constantly rotating die plate having a nut receiving opening therein, a plunger operatively associated with said chute and die plate, means for moving the plunger to deliver a nut from the chute to said die plate, a timing finger carried by said plunger, said timing finger cooperating with said die plate to permit movement of the nut delivery plunger only when a nut is properly aligned with the nut receiving opening in the die plate and a stop gauge carried by said nut delivering plunger for engaging a bolt to be nutted after the die plate has rotated a predetermined number of revolutions, said stop gauge constituting means for moving the nut out of the nut receiving opening in the die plate after a subsequent predetermined number of revolutions of the die plate.

4. A device of the class described, comprising, in combination, a feeding mechanism for nuts, a constantly rotatable die plate, means for transferring a nut from said mechanism to the die plate, and a timing finger carried by said means and operating on the die plate for governing the transfer action of said means.

5. A device of the class described, comprising, in combination, a feeding mechanism for nuts, a rotating die plate having an opening therein for receiving a nut, a plunger, means urging the plunger toward said die plate to deliver a nut thereto, a device for moving the plunger against the action of said means, a timing finger carried by said plunger and engaging with said die plate and means for moving said finger out of engagement with said die plate.

6. A device of the class described, comprising, in combination, a feeding mechanism for nuts, a rotating die plate having an opening therein for receiving a nut, a plunger, means urging the plunger toward said die plate to deliver a nut thereto, a device for moving the plunger against the action of said means, and a timing finger carried by said plunger and engaging with said die plate, said device being operable to move said finger out of engagement with the die plate.

7. A device of the class described, comprising, in combination, a chute for feeding nuts, a constantly rotating receiving means having an opening for receiving the nuts, the opening having a configuration corresponding with the shape of the nuts, instrumentalities comprising a resilient plunger registering with the said opening for transferring the nuts from the chute to the said opening, and mechanism for automatically operating the plunger when the said opening becomes aligned with a nut, the mechanism comprising a plurality of notches on the rotating receiving means, a finger for engagement therewith, and means for bringing the finger into engagement with the notch, whereby the plunger is enabled to push a nut into the said opening.

8. A device of the class described, comprising in combination, a chute for feeding nuts, a constantly rotating receiving means driven from a source of power, the receiving means having an opening for receiving the nuts and also being provided with a clearance groove and notches communicating therewith, instrumentalities for transferring the nuts from the chute to the opening in the receiving means, timing mechanism for engaging the notches and simultaneously initiating the transferring instrumentalities, means for operating the timing mechanism, and means for transmitting motion to the receiving means.

9. A device of the class described, comprising, in combination, a chute for feeding nuts, a constantly rotating receiving means for the nuts comprising a constantly rotating plate provided with an opening having a configuration corresponding to that of the nuts and also being provided with a clearance groove and notches communicating therewith, instrumentalities for transferring the nuts from the chute to the opening in the receiving means as the opening comes into registry with a nut presented thereto, means for initiating the operation of the transferring instrumentalities, the said means comprising a resiliently mounted finger associated with the transferring instrumentalities and normally positioned out of engagement with the notches but engageable therewith at the will of an operator, means for operating the said finger to bring it into engagement with a notch to thereby set up operation of the nut transferring instrumentalities for insertion of a nut into the opening in the said rotating plate, and means for driving the plate.

10. A device of the class described, comprising the combination with a supporting frame, of a chute for feeding nuts, a constantly rotating receiving means for the nuts adjacent the chute and comprising a constantly rotating plate provided with an opening having a configuration corresponding to that of the nuts and registering with an aperture in the adjacent wall of the chute, the rotating plate being provided with a clearance groove and notches communicating therewith, instrumentalities for transferring the nuts from the chute to the opening in the rotating plate and comprising a resiliently mounted plunger journalled in the chute and in the supporting frame and being in axial alignment with the opening in the rotating plate, the plunger transferring the nuts from the chute to the opening in the rotating plate as the opening comes into registry with a nut presented thereto, means for initiating operation of the plunger, the said means comprising a resiliently mounted finger carried by the plunger and normally positioned out of engagement with the notches, but engageable therewith at the will of the operator, the finger being provided with a cam-shaped end, a laterally movable lever carrying an abutment member for engagement with the cam-shaped end of the finger when the lever is moved in one direction to operate the said finger, the said plunger being provided with an abutment member for engaging with the lever as the lever is moved in the other direction to withdraw the plunger out of engagement with the said rotating plate for reinsertion of a nut therein, and means for driving the rotating plate.

11. In a device of the class described, in combination, a chute for feeding nuts, a constantly rotating member having an opening for receiving the nuts, means for transferring the nuts from the chute to the rotating member as the opening comes into register with the nuts as the said member rotates to automatically thread the nut to a bolt applied thereto, the said means comprising a resiliently mounted plunger and a timing device carried thereby, the timing device operating against the said rotating member which is provided with a plurality of notches for receiving the timing device as the opening registers with the nut to permit insertion within the opening of each succeeding nut as the previously inserted nut is applied to a bolt and withdrawn, and means for operating the said timing device and plunger to bring the plunger into and out of engagement with each successive nut fed into position.

12. In a device of the class described, in combination, a chute for feeding nuts, a constantly rotating member having an opening for receiving the nuts, and for threading the nuts upon bolts applied thereto, means for transferring the nuts from the chute to said opening in the rotating member as the opening is brought into registration with the nut including an associated timing device arranged for operation by the rotary member to effect movement of said transfer means simultaneously with the registration of the opening in the rotary member with a nut and means for operating said transfer means under control of said timing means, said transfer means constituting means for automatically removing the nut out of the opening in the rotating member after a bolt has been inserted into the nut and the rotating member has rotated a predetermined number of revolutions.

13. In a device of the class described, in combination, a chute for feeding nuts, a constantly rotating member having an opening for receiving the nuts and for threading the nuts upon bolts applied thereto, means for transferring the nuts from the chute to the opening in the rotating member as the opening is brought into registration with the nut and for threading the nut to a definite number of turns upon a bolt presented thereto, a timing device operating on the rotating member for producing operation of the transferring means simultaneously with the registration of the opening with the nut, and means for operating the timing device and transferring means.

In testimony whereof I affix my signature.

BEN M. SAWYER.